(12) United States Patent
Hu et al.

(10) Patent No.: US 10,580,096 B2
(45) Date of Patent: Mar. 3, 2020

(54) METHOD FOR DETERMINING INTEGRATED NETWORK LOSS RATE IN UHV AC CROSS-REGIONAL ELECTRICITY TRADING

(71) Applicants: STATE GRID CORPORATION OF CHINA, Beijing (CN); ECONOMIC & TECHNOLOGY RESEARCH INSTITUTE OF HUBEI ELECTRIC POWER COMPANY, Wuhan, Hubei (CN)

(72) Inventors: Ting Hu, Hubei (CN); Yinya Zhang, Hubei (CN); Dongjun Yang, Hubei (CN); Shunming Bai, Hubei (CN); Jingyou Xu, Hubei (CN); Daqiang Xiao, Hubei (CN); Cong Wei, Hubei (CN)

(73) Assignees: STATE GRID CORPORATION OF CHINA ECONOMIC & TECHNOLOGY RESEARCH, Beijing (CN); INSTITUTE OF HUBEI ELECTRIC POWER COMPANY, Wuhan, Hubei (CN)

(*) Notice: Subject to any disclaimer, the term of this patent is extended or adjusted under 35 U.S.C. 154(b) by 882 days.

(21) Appl. No.: 15/151,907

(22) Filed: May 11, 2016

(65) Prior Publication Data

US 2016/0253768 A1 Sep. 1, 2016

Related U.S. Application Data

(63) Continuation of application No. PCT/CN2014/086679, filed on Sep. 17, 2014.

(30) Foreign Application Priority Data

Dec. 18, 2013 (CN) .......................... 2013 1 0700875

(51) Int. Cl.
 G06Q 50/06 (2012.01)
 G06Q 30/06 (2012.01)
 (Continued)

(52) U.S. Cl.
 CPC ............. *G06Q 50/06* (2013.01); *G06F 17/18* (2013.01); *G06Q 30/06* (2013.01); *H02J 3/00* (2013.01);
 (Continued)

(58) Field of Classification Search
 CPC ........ G06F 17/18; G06Q 50/06; G06Q 30/06; H02J 3/00
 See application file for complete search history.

(56) References Cited

U.S. PATENT DOCUMENTS 5,680,324 A * 10/1997 Schweitzer, III ........ H02H 3/00
 340/870.02
9,288,071 B2 * 3/2016 Liao ..................... H04N 17/004

FOREIGN PATENT DOCUMENTS

CN 101714234 A 5/2010
CN 101860025 A 10/2010
(Continued)

OTHER PUBLICATIONS

International Search Report issued by the State Intellectual Property Office of the Peoples Republic of China dated Dec. 17, 2014 for PCT/CN2014/086679.

*Primary Examiner* — Bryan Bui
(74) *Attorney, Agent, or Firm* — Locke Lord LLP; Tim Tingkang Xia, Esq.

(57) ABSTRACT

The invention relates to a method for determining an integrated network loss rate in the UHV AC cross-regional electricity trading. The method includes fitting a curve relationship between integrated network loss rates and transmitting powers on the basis of theoretical calculations of the (Continued)

UHV AC transmission line loss, using a relational fitted curve between actual values of integrated network loss rates and transmitting powers calculated according to gateway power statistical data to perform geometrical average correction on the original curve, and making planned values of the integrated network loss rates to be closer to the actual values according to a method for determining UHV AC integrated network loss rates according to a correction curve function relation, which greatly increases fairness of the trading settlement. The method is simple and easy to implement with high accuracy, and applicable to planning and trading settlement of regular or real-time UHV AC electricity trading.

4 Claims, 5 Drawing Sheets

(51) Int. Cl.
*H02J 3/00* (2006.01)
*G06F 17/18* (2006.01)

(52) U.S. Cl.
CPC ......... *H02J 2003/007* (2013.01); *Y02E 60/76* (2013.01); *Y04S 10/60* (2013.01); *Y04S 40/22* (2013.01); *Y04S 50/10* (2013.01)

(56) References Cited

FOREIGN PATENT DOCUMENTS

| | | | | |
|---|---|---|---|---|
| CN | 102231171 A | | 11/2011 | |
| CN | 102969711 A | * | 3/2013 | ............... H02J 3/00 |
| CN | 103246802 A | | 8/2013 | |
| CN | 103646356 A | | 3/2014 | |

* cited by examiner

METHOD FOR DETERMINING INTEGRATED NETWORK LOSS RATE IN UHV AC CROSS-REGIONAL ELECTRICITY TRADING

CROSS-REFERENCE TO RELATED APPLICATIONS

This application is a continuation application of International Patent Application No. PCT/CN2014/086679, filed Sep. 17, 2014, entitled "METHOD FOR DETERMINING INTEGRATED NETWORK LOSS RATE IN ULTRA-HIGH VOLTAGE ALTERNATING CURRENT CROSS-REGIONAL ENERGY TRADE," by Ting Hu et al., which itself claims the priority to Chinese Patent Application No. 201310700875.8, filed Dec. 18, 2013, in the State Intellectual Property Office of P.R. China, entitled "METHOD FOR DETERMINING INTEGRATED NETWORK LOSS RATE IN ULTRA-HIGH VOLTAGE ALTERNATING CURRENT CROSS-REGIONAL ENERGY TRADE," by Ting Hu et al., which are hereby incorporated herein in their entireties by reference.

FIELD OF THE INVENTION

The present invention relates to a method for determining an integrated network loss rate in UHV AC cross-regional electricity trading, and belongs to the field of line loss management and trading settlement related to UHV electricity trading.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art.

China has a vast geographic area, and energy resources and electricity loads are distributed very unevenly. The developments of astrong smart grids of ultra-high voltages (UHV) as a backbone network frame can implement cross-regional, long-distance, high-power electric power transmissions and exchanges, and optimization of wide-range power resource distributions. An UHV grid refers to a 1000 kV AC grid or ±800 kV DC grid, which is characterized by high voltages, great power, small losses, long power transmission distances and a single circuit structure. In China, UHV projects that have been put into operation at present include the southeastern Shanxi-Nanyang-Jingmen 1000 kV UHV AC test and demonstration project, the Sichuan (Xiangjiaba)-Shanghai ±800 kV UHV DC transmission project, and the Jinping-South Jiangsu ±800 kV UHV DC transmission project.

The network loss rate is defined as system loss increment caused by power consumption or transmission of per unit increment under particular time and operation manner. The UHV integrated network loss rate can be calculated through the total loss of power (including a line loss, a transformer loss, and further including a convertor station loss for DC transmission) divided by the power-giving/outputting at the starting node/port in the system. The trading network loss is one of the main trading costs, in planning and trading settlement of UHV cross-regional electricity trading, effects of the network loss on the trading plan and settlement cost must be taken into account, it is necessary to correct or reduce the settlement power or bid price according to the size of the integrated network loss rate planned value. Thus, the method for determining the UHV integrated network loss rate planned value is scientific and reasonable directly relates to economic interests of the parties of the trading, and close attention is paid thereto by trading related parties.

At present, a theoretical calculation method of UHV AC integrated network loss rates uses a power system analysis program recognized in this field, for example, a power system analysis synthesis program (PSASP) developed by China's electricity academy, to make load flow calculation on an actual system (the load flow calculation is calculation of determining steady running state parameters of respective parts of the power system according to a given grid structure, parameter and generator, load and other elements' operating conditions), to obtain powers passing through the UHV AC line and the beginning and the end of the transformer, and then calculate theoretical values of integrated network loss rate corresponding to different transmitting powers of the UHV AC line. For high-voltage and long-distance transmission lines, power loss thereof mainly includes two parts: one is resistive loss, which is caused by heating of line resistance and is a function of line resistance, wire length and line current; the other is corona loss, which is caused by corona discharge formed by ionization of air around the wire under the action of a strong electric field and is affected by meteorological condition, conductor selection, operating voltage and other factors, where the corona loss is represented by ground conductance in a transmission line model. As line-to-ground parameters in an AC line model of a related program such as PSASP only takes shunt capacitance into account and omits ground conductance, if the integrated network loss rate is calculated directly using the result of the load flow calculation of the related program such as PSASP, actually only the resistive loss of the line is taken into account, but the corona loss of the line is not considered, the corona loss of the line at 110 kV or therebelow is very tiny and can basically be ignored, however, as the corona loss is directly proportion to the square of the voltage, the corona loss of EHV and UHV AC power transmission has been a greater value and must be considered. Therefore, the theoretical calculation value of the UHV AC integrated network loss rate obtained through the related program such as PSASP definitely has certain errors due to not considering the corona loss of the line.

The method for calculating the actual value of the UHV AC integrated network loss rate uses gateway power statistical data of a certain time period in actual project practice to calculate the integrated network loss rate, and the calculation result is more precise; however, as measurement accuracy, calculated error and other factors of a metering device, also have a certain error, and the method is calculated afterwards, in consideration of timeliness of trading settlement, the method cannot be directly applied to planning and trading settlement of UHV cross-regional electricity trading.

At present, in the planning and trading settlement of UHV cross-regional electricity trading, a method for determining a planned value of the integrated network loss rate has yet not existed, and a common method is setting a single fixed network loss rate. By taking the southeastern Shanxi-Nanyang-Jingmen 1000 kV UHV AC test and demonstration project as an example, the project starts from a transformer substation in southeastern Shanxi (Changzhi), via a transformer substation in Nanyang, Henan, and terminates at a transformer substation in Jingmen, Hubei, connects power grids in two big regions, North China and Central China, and is an important transmission channel through which the coal energy center in the northwest region transmits power to the load center in the mid-east region, and in the transaction planning and settlement process of the project, the planned value of the integrated network loss rate is uniformly set as 1.5%. Although using a fixed network loss rate is simple, the following problems still exist:

1. The UHV AC integrated network loss rate varies with the change of the UHV transmission power, and the use of a fixed value has poor accuracy. Inaccurate determination of the integrated network loss rate will directly lead to inaccurate calculation of the settlement power in the UHV trading settlement, thereby affecting fairness of the transaction. It is found by statistically analyzing historical data of the UHV AC demonstration project in the past two years that, although the UHV AC integrated network loss rate is mostly maintained between 1.4%-1.5%, the minimum network loss rate is merely 1.22%, the maximum network loss rate is up to 2.17%, and the current method that plans the network loss rate as a fixed value regardless of the size of the UHV transmission power is evidently not reasonable.

2. Scalability and extensibility are lacking. The UHV AC integrated network loss rate is closely related to the transmission power, when the UHV AC actual transmission power exceeds a historical data range of projection practice, the integrated network loss rate will vary greatly, the network loss rate cannot be corrected quickly according to the current method, and scalability and extensibility are poor. With respect to deficiencies of the use of the fixed value as the planned value of the UHV AC integrated network loss rate, it is feasible to consider, in combination with UHV AC transmission theoretical line loss calculation and actual line loss rate calculation results, using the least square method or a method of curve fitting with related software (e.g., Excel, SPSS, MATLAB) to obtain a function relation between UHV AC integrated network loss rates and transmission powers, to seek out a scientific and reasonable method for determining the planned value of the integrated network loss rate applied to UHV AC cross-regional electricity trading; as the UHV AC line network structure is relatively simple, generally, the integrated network loss rate and the transmitting power present a relationship of quadratic parabola.

Therefore, a heretofore unaddressed need exists in the art to address the aforementioned deficiencies and inadequacies.

SUMMARY OF THE INVENTION

One of the objectives of the present invention is to provide a method for determining an integrated network loss rate in UHV AC cross-regional electricity trading. The method, with respect to the problem existing in the existing practice of using a fixed value as the integrated network loss rate in UHV AC electricity trading line loss management and trading settlement, puts forward fitting a curve relationship between integrated network loss rates and transmitting powers on the basis of theoretical calculations of the UHV AC transmission line loss, then uses a relational fitted curve between actual values of integrated network loss rates and transmitting powers calculated according to gateway power statistical data to perform geometrical average correction on the original curve, and finally causes planned values of the integrated network loss rates to be closer to the actual values according to a method for determining UHV AC integrated network loss rates according to a correction curve function relation, which greatly increases fairness of the trading settlement. The method of the invention is simple and easy to implement with the high accuracy, and applicable to planning and power settlement of regular or real-time UHV AC electricity trading. The invention provides a new idea and method for operation, management and trading settlement of UHV AC transmission lines.

In one aspect of the invention, the method for determining an integrated network loss rate in UHV AC cross-regional electricity trading comprises the steps of:

(a) by calculation according to the following formula, obtaining theoretical calculation values $\eta_{theoretical}$ of integrated network loss rates corresponding to different transmitting powers of a UHV AC line, which is:

$$\eta_{theoretical} = \frac{\Delta P_R + \Delta P_C + \Delta P_T}{P}$$

wherein P is the UHV AC transmitting power, $\Delta P_R$ is the resistive loss of the UHV AC line, $\Delta P_T$ is the energy loss for main transformer of a UHV AC system; $\Delta P_C$ is the corona loss of the UHV AC line;

(b) curve-fitting the different transmitting powers of the UHV AC line and the corresponding theoretical calculation values $\eta_{theoretical}$ of integrated network loss rates by using the least square method in a rectangular coordinate system where the abscissa is the UHV AC transmitting power and the ordinate is the integrated network loss rate, to obtain a fitted curve $\eta_1(P)=a_0+b_0 \times P+c_0 \times P^2$ of relations between the theoretical calculation values of UHV AC integrated network loss rates and transmitting powers;

(c) according to gateway power statistical data, determining an average transmitting power within respective different-duration time periods of the UHV AC system and obtaining through calculation according to the following formula an actual calculation value $\eta_{actual}$ of the corresponding integrated network loss rate in each time period, which is:

$$\eta_{actual} = \frac{\Delta Q}{Q} = \frac{\sum_i SQ_i(+) + \sum_i RQ_i(-)}{\sum_i SQ_i(+)}$$

wherein $\Delta Q$ is the total network loss power of the UHV AC system in each time period, Q is the total power-giving of the UHV AC system in the time period;

$$\sum_i SQ_i$$

is the sum of power-giving of pressure-side gateways in all UHV main transformers in the time period, and $$\sum_i RQ_i$$

is the sum of power-receiving of the pressure-side gateways in all UHV main transformers in the time period;

(d) curve-fitting the UHV AC average transmitting powers and the corresponding actual calculation values $\eta_{actual}$ integrated network loss rates by using the least square method in a rectangular coordinate system where the abscissa is the UHV AC transmitting power and the ordinate is the integrated network loss rate, to obtain a fitted curve $\eta_2(P)=a_1+b_1\times+c_1\times P^2$ of relations between the actual calculation values of UHV AC integrated network loss rates and transmitting powers;

(e) selecting n+1 points, $[P_1,\eta_1(P_1)]$, $[P_2, \eta_1(P_2)]$ ... $[P_i, \eta_1(P_i)]$, ... $[P_{n+1}, \eta_1(P_{n+1})]$, from the fitted curve of relations between the theoretical calculation values of UHV AC integrated network loss rates and transmitting powers, wherein $P_i$ is the minimum transmitting power of the UHV AC line, $P_{n+1}$ is the maximum transmitting power of the UHV AC line, $$P_i = P_1 + \frac{(P_{n+1} - P_1)\times(i-1)}{n},$$

i=1, 2, . . . , n, n+1; then selecting n+1 points with the same abscissa, $[P_i, \eta_2(P_i)]$, $[P_2, \eta_2(P_2)[$ . . . $]P_i, \eta_2(P_i)]$, . . . $[P_{n+1}, \eta_2(P_{n+1})]$, from the fitted curve of relations between the actual calculation values of UHV AC integrated network loss rates and transmitting powers, through geometric average correction, obtaining points, $[P_1, \sqrt{\eta_1(P_1)\eta_2(P_1)}]$, $[P_2, \sqrt{\eta_1(P_2)}]$ . . . $[P_i, \sqrt{\eta_1(P_i)\eta_2(P_i)}]$ . . . $[P_{n+1}, \sqrt{\eta_1(P_{n+1})\eta_2(P_{n+1})}]$, on a correction curve, and obtaining by fitting a correction relation $\eta_{correct}(P)=a_3+b_3\times P+c_3\times P^2$ between UHV AC integrated network loss rates and transmitting powers by using the least square method in a rectangular coordinate system where the abscissa is the UHV AC transmitting power and the ordinate is the integrated network loss rate;

(f) for UHV AC transmission projects with gateway power historical statistical data, in transaction planning and settlement thereof, substituting UHV AC planned average transmitting powers in a transaction time period into the correction relation $\eta_{correct}(P)=a_3+b_3\times P+c_3\times P^2$, to obtain planned values of UHV AC integrated network loss rates; for UHV AC transmission projects without gateway power historical statistical data, in transaction planning and settlement thereof, substituting a UHV AC planned average transmitting power in a transaction time period into a theoretical calculation value fitted curve function relation $\eta_1(P)=a_0+b_0\times P+c_0\times P^2$, to obtain calculating values of UHV AC integrated network loss rates.

In one embodiment, a method of dividing the respective time periods in step c is: recording changes of the UHV AC transmitting powers with hour data on the hour, the transmitting power of the starting hour on the hour in each time period being an initial power, and when varying amplitude of the transmitting power of the subsequent hour on the hour reaches a % (a value between 5% and 10%) of the initial power, entering into next time period.

In one embodiment, the n in step (e) is ∈ {20, 21, 22, . . . 200}.

According to the present invention, the method has, among other things, the following advantages:

1. Curve fitting is performed based on line loss theoretical calculation, correct of an actual value fitted curve calculated according to gateway power statistical data is taken as an adjustment means to determined the planned value of the UHV AC integrated network loss rate, avoiding the error brought about by simply using a certain method. In addition, with continuous accumulation of gateway statistical data, it is feasible to perform continuous deviation correction on the original fitted curve, which has high accuracy, strong persuasion and good reliability.

2. Values of integrated network loss rates is determined according to a function relation between UHV AC integrated network loss rates and transmitting powers, which can better reflect a trend that the UHV AC integrated network loss rates vary with the transmitting powers, overcomes the disadvantage of poor accuracy of the use of fixed planned values of integrated network loss rates, and greatly reduces the deviation between planned network loss rates and actual network loss rates, causing UHV AC electricity trading settlement to be fairer and more reasonable.

3. It is not restricted by time, it is feasible to be used in regular transaction line loss management and trading settlement, it is also feasible to be applied to real-time transaction, and the method is simple and easy to implement and has strong practicability.

4. It has better scalability and extensibility. When the UHV AC transmitting power exceeds the scope of the original data, it is still feasible to rapidly determine the corresponding integrated network loss rate value according to the fitted curve.

These and other aspects of the present invention will become apparent from the following description of the preferred embodiment taken in conjunction with the following drawings, although variations and modifications therein is affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The present invention will now be described more fully hereinafter with reference to the accompanying drawings, in which exemplary embodiments of the present invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

The terms used in this specification generally have their ordinary meanings in the art, within the context of the present invention, and in the specific context where each term is used. Certain terms that are used to describe the present invention are discussed below, or elsewhere in the specification, to provide additional guidance to the practitioner regarding the description of the present invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the present invention or of any exemplified term. Likewise, the present invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions and/or sections, these elements, components, regions and/or sections should not be limited by these terms. These terms are only used to distinguish one element, component, region or section from another element, component, region or section. Thus, a first element, component, region or section discussed below can be termed a second element, component, region or section without departing from the teachings of the present invention.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about", "substantially" or "approximately" shall mean within 20 percent, preferably within 10 percent, and more preferably within 5 percent of a given value or range. Numerical quantities given herein are approximate, meaning the terms "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

The description below is merely illustrative in nature and is in no way intended to limit the present invention, its application, or uses. The broad teachings of the present invention can be implemented in a variety of forms. Therefore, while this disclosure includes particular examples, the true scope of the present invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the present invention.

Figure 1:
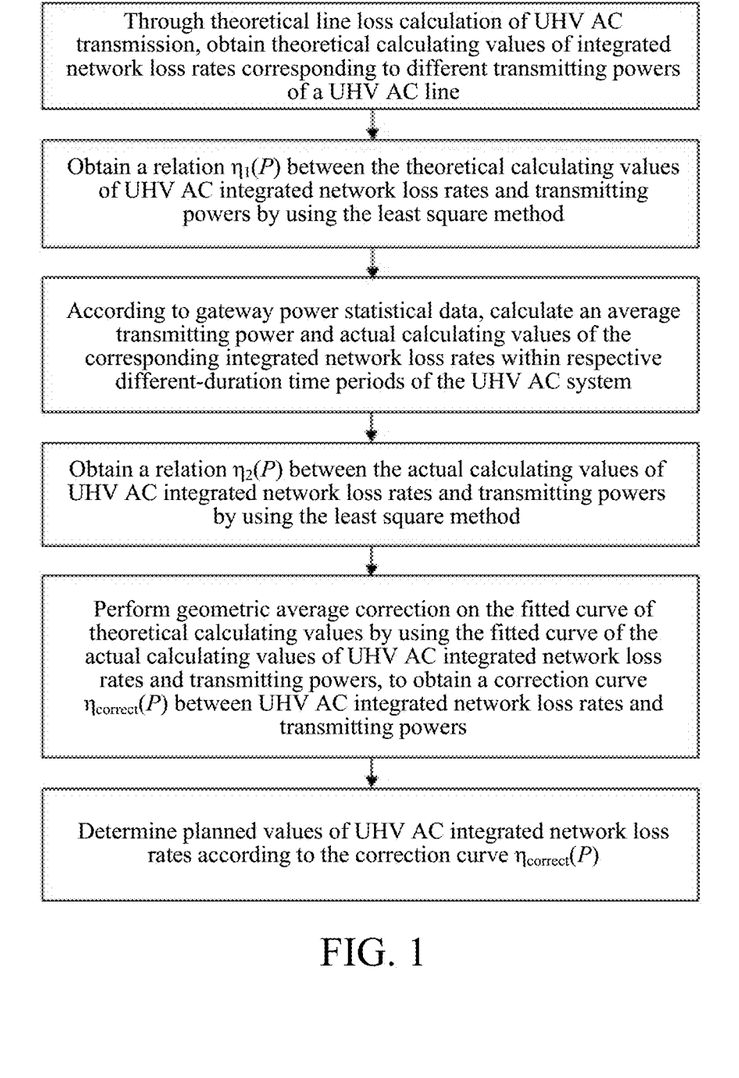
FIG. 1 is a schematic flowchart of a method for determining an integrated network loss rate in UHV AC cross-regional electricity trading according to one embodiment of the invention.

Referring to FIG. 1, a flow of a method for determining an integrated network loss rate in UHV AC cross-regional electricity trading is shown according to one embodiment of the present invention. The method comprises the following steps.

First, at step (a), various typical operating manners representing a particular year are selected for theoretical calculation of integrated network loss rates, to calculate a power range that covers smaller values to UHV AC rated transmitting powers, theoretical calculation values $\eta_{theoretical}$ of integrated network loss rates corresponding to different transmitting powers of a UHV AC line are calculated according to the following formula:

$$\eta_{theoretical} = \frac{\Delta P_R + \Delta P_C + \Delta P_T}{P}$$

wherein: P is the UHV AC transmitting power; $\Delta P_R$ and $\Delta P_T$ are respectively the resistive loss of the UHV AC line and the energy loss for main transformer of a UHV AC system calculated through the related program such as PSASP; $\Delta P_C$ is the corona loss of the UHV AC line, as the corona loss is irrelevant to the line current, it is a constant relative to the change of the power and can be estimated in combination with weather conditions of regions where the UHV AC line passes and actual measured values of the corona loss under various weather conditions.

At step (b), the different transmitting powers of the UHV AC line and the corresponding theoretical calculation values $\eta_{theoretical}$ integrated network loss rates are curve-fitted by using the least square method in a rectangular coordinate system where the abscissa is the UHV AC transmitting power and the ordinate is the integrated network loss rate, to obtain a fitted curve $\eta_1(P)=a_0+b_0\times P+c_0\times P^2$ of relations between the theoretical calculation values of UHV AC integrated network loss rates and transmitting powers.

At step (c), according to gateway power statistical data, an average transmitting power within respective different-duration time periods of the UHV AC system is determined and an actual calculation value $\eta_{actual}$ of the corresponding integrated network loss rate in each time period is obtained through calculation according to the following formula, which is:

$$\eta_{actual} = \frac{\Delta Q}{Q} = \frac{\sum_i SQ_i(+) + \sum_i RQ_i(-)}{\sum_i SQ_i(+)}$$

wherein $\Delta Q$ is the total network loss power of the UHV AC system in each time period, Q is the total power-giving of the UHV AC system in the time period;

$$\sum_i SQ_i$$

is the sum of power-giving of pressure-side gateways in all UHV main transformers in the time period, and $$\sum_i RQ_i$$

is the sum of power-receiving of the pressure-side gateways in all UHV main transformers in the time period.

In one embodiment, a method for dividing the respective time periods is: recording changes of the UHV AC transmitting powers with hour data on the hour, the transmitting power of the starting hour on the hour in each time period is an initial power, and when varying amplitude of the transmitting power of the subsequent hour on the hour reaches a % (a value between 5% and 10%) of the initial power, entering into next time period.

At step (d), the UHV AC average transmitting powers and the corresponding actual calculation values $\eta_{actual}$ of integrated network loss rates are curve-fitted by using the least square method in a rectangular coordinate system where the abscissa is the UHV AC transmitting power and the ordinate is the integrated network loss rate, to obtain a fitted curve $\eta_2(P)=a_1+b_1\times P+c_1\times P^2$ of relations between the actual calculation values of UHV AC integrated network loss rates and transmitting powers.

At step (e), selecting n+1 points, $[P_1, \eta_1(P_1)]$, $[P_2, \eta_1(P_2)]$ ... $[P_i, \eta_1(P_i)]$, ... $[P_{n+1}, \eta_1(P_{n+1})]$, from the fitted curve of relations between the theoretical calculation values of UHV AC integrated network loss rates and transmitting powers, wherein $P_1$ is the minimum transmitting power of the UHV AC line, $P_{n+1}$ is the maximum transmitting power of the UHV AC line, $$P_i = P_1 + \frac{(P_{n+1} - P_1) \times (i-1)}{n},$$

i=1, 2, ..., n, n+1; then selecting n+1 points with the same abscissa, $[P_1, \eta_2(P_1)]$, $[P_2, \eta_2(P_2)]$ ... $[P_i, \eta_2(P_i)]$, ... $[P_{n+1}, \eta_2(P_{n+1})]$, from the fitted curve of relations between the actual calculation values of UHV AC integrated network loss rates and transmitting powers, through geometric average correction, obtaining points, $[P_1, \sqrt{\eta_1(P_1)\eta_2(P_1)}]$, $[P_2, \sqrt{\eta_1(P_2)\eta_2(P_2)}]$ ... $[P_i, \sqrt{\eta_1(P_i)\eta_2(P_i)}]$, ... $[P_{n+1}, \sqrt{\eta_1(P_{n+1})\eta_2(P_{n+1})}]$, on a correction curve, and obtaining by fitting a correction relation $\eta_{correct}(P)=a_3, +b_3, \times P+c_3, \times P^2$ between UHV AC integrated network loss rates and transmitting powers by using the least square method in a rectangular coordinate system where the abscissa is the UHV AC transmitting power and the ordinate is the integrated network loss rate.

At step (f), for UHV AC transmission projects with gateway power historical statistical data, in transaction planning and settlement thereof, UHV AC planned average transmitting powers in a transaction time period (obtained by the UHV AC planned transaction power value in the transaction time period divided by a time length) are substituted into the correction relation $\eta_{correct}(P)=a_3, +b_3, \times P+c_3, \times P^2$, to obtain planned values of UHV AC integrated network loss rates; for UHV AC transmission projects without gateway power historical statistical data, in transaction planning and settlement thereof, substituting a UHV AC planned average transmitting power in a transaction time period into a theoretical calculation value fitted curve function relation $\eta_1(P)=a_0+b_0\times P+c_0\times P^2$, to obtain calculating values of UHV AC integrated network loss rates.

Without intent to limit the scope of the invention, specific embodiments of the method of the present invention is further described below in details by using the UHV AC transmission projects in China as examples.

The method for determining an integrated network loss rate in UHV AC cross-regional electricity trading according to the present invention is applied to monthly line loss management and trading settlement of electricity trading of the southeastern Shanxi-Nanyang-Jingmen 1000 kV UHV AC demonstration project, and specific implementation steps are as follows.

Figure 2:
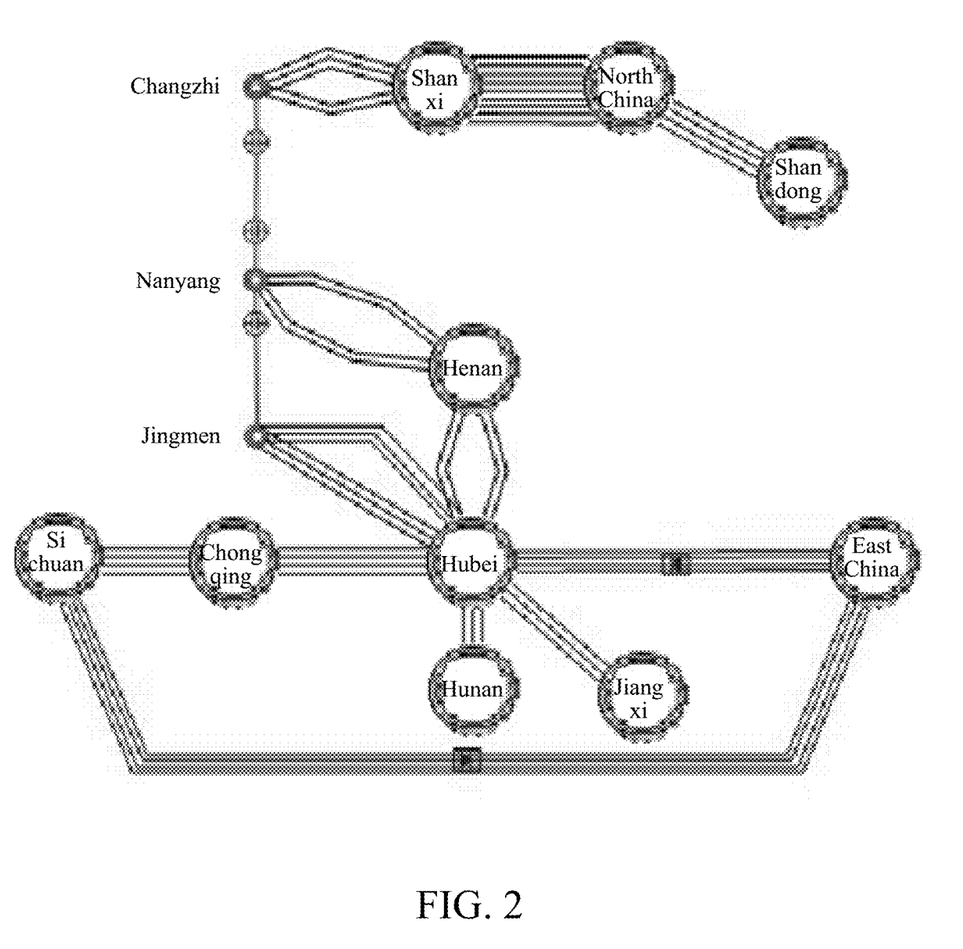
FIG. 2 is a schematic diagram of a 1000 kV southeastern Shanxi-Nanyang-Jingmen UHV AC test and demonstration project according to one embodiment of the invention.

As shown in FIG. 2, the 1000 kV southeastern Shanxi-Nanyang-JingmenUHV AC test and demonstration project starts from a transformer substation in southeastern Shanxi (Changzhi), via a transformer substation in Nanyang, Henan, and terminates at a transformer substation in Jingmen, Hubei. UHV AC line loss theoretical calculation is made by using PSASP developed by China's electricity academy, and various typical operating manners representing a particular year are selected to calculate a power range that covers smaller values to UHV AC rated transmitting powers. The result of the UHV AC line loss theoretical calculation is a correction value after corona loss is considered on the basis of the related program calculation result, reference can be made to the formula (1) for a specific calculation method, the line corona loss used in the calculation is estimated according to related document literature in combination with weather conditions of regions where the UHV AC demonstration project line passes and actual measured values of the corona loss under various weather conditions, the annual mean corona loss power of the UHV AC line is estimated as 14.81 kW/km, the corona loss power of the long southern line is 5.31 MW, the corona loss power of the South Jingmen line is 4.16 MW, and the annual mean corona loss power of the full line is 9.47 MW. The UHV AC transmitting powers and the corresponding theoretical calculation results of the integrated network loss rates are as shown in the table below:

TABLE 1

Calculation results of theoretical values of integrated network loss rates and corresponding transmitting powers of a UHV AC demonstration project

| UHV AC transmitting power (GW) | Theoretical values of integrated network loss rates |
| --- | --- |
| 80 | 1.98% |
| 250 | 1.72% |
| 200 | 1.57% |
| 130 | 1.49% |
| 190 | 1.51% |
| 100 | 1.63% |
| 380 | 1.98% |
| 400 | 2.17% |
| 500 | 2.86% |
| 580 | 3.10 |

Figure 3:
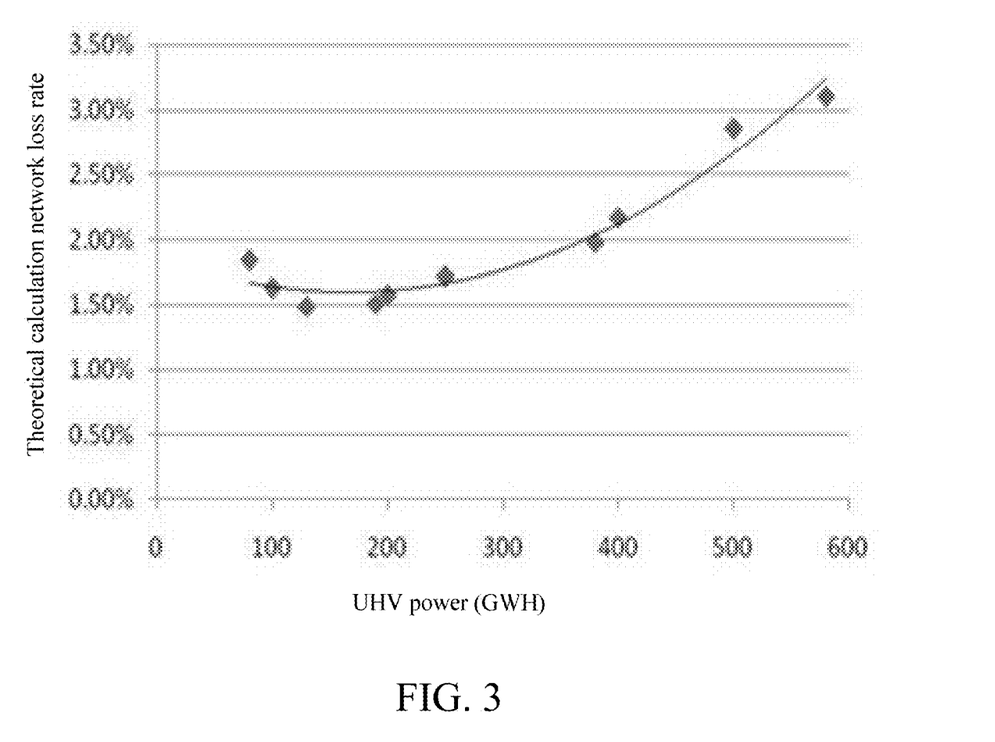
FIG. 3 is a schematic diagram of a relational fitted curve of theoretical calculation values of integrated network loss rates and transmitting powers of a UHV AC demonstration project according to one embodiment of the invention.

A scatter diagram of theoretical calculation values of UHV AC integrated network loss rates and transmitting powers drawn according to the data in Table 1 is as shown in FIG. 3, it is clear from the figure that the UHV AC integrated network loss rate presents an evident U-shaped quadratic curve relation with the change of the transmitting power, with increase of the UHV AC transmitting power, the integrated network loss rate first decreases and then increases, and curve fitting is carried out by using the least square method, to calculate a function expression of the fitted curve as follows:

$$\eta_1(P)=1.958-0.004P+1.038\times10^{-5}P^2$$

A variation curve of the UHV AC transmitting powers recorded with hour data on the hour is divided into multiple segments with different time lengths, and a specific dividing method is: the transmitting power of the starting hour on the hour in each time period being an initial power, and when varying amplitude of the transmitting power of the subsequent hour on the hour reaches 10% of the initial power, entering into next time period. An average transmitting power within each time period of the UHV AC system is determined according to the gateway power historical statistical data of the UHV AC demonstration project and the time lengths of respective segments divided, and actual calculation values $\eta_{actual}$ of the corresponding integrated network loss rates in each time period are calculated according to the formula (2); calculation results are as follows:

TABLE 2

Calculation results of actual values of integrated network loss rates and corresponding transmitting powers after the main transformer in Nanyang is put into operation

| Time period serial number | UHV AC transmitting power (GW) | Actual values of integrated network loss rates |
| --- | --- | --- |
| 1 | 182.63 | 1.504% |
| 2 | 200.26 | 1.455% |
| 3 | 236.39 | 1.609% |
| 4 | 217.64 | 1.458% |
| 5 | 168.23 | 1.217% |
| 6 | 103.89 | 1.573% |
| 7 | 153.15 | 1.385% |
| 8 | 158.19 | 1.464% |
| 9 | 169.51 | 1.409% |
| 10 | 86.82 | 1.408% |
| 11 | 196.20 | 1.317% |
| 12 | 208.13 | 1.417% |
| 13 | 231.38 | 1.596% |
| 14 | 196.56 | 1.435% |
| 15 | 234.67 | 1.428% |
| 16 | 201.41 | 1.343% |
| 17 | 174.04 | 1.444% |
| 18 | 92.33 | 1.757% |
| 19 | 87.82 | 1.826% |
| 20 | 65.34 | 2.167% |

Figure 4:
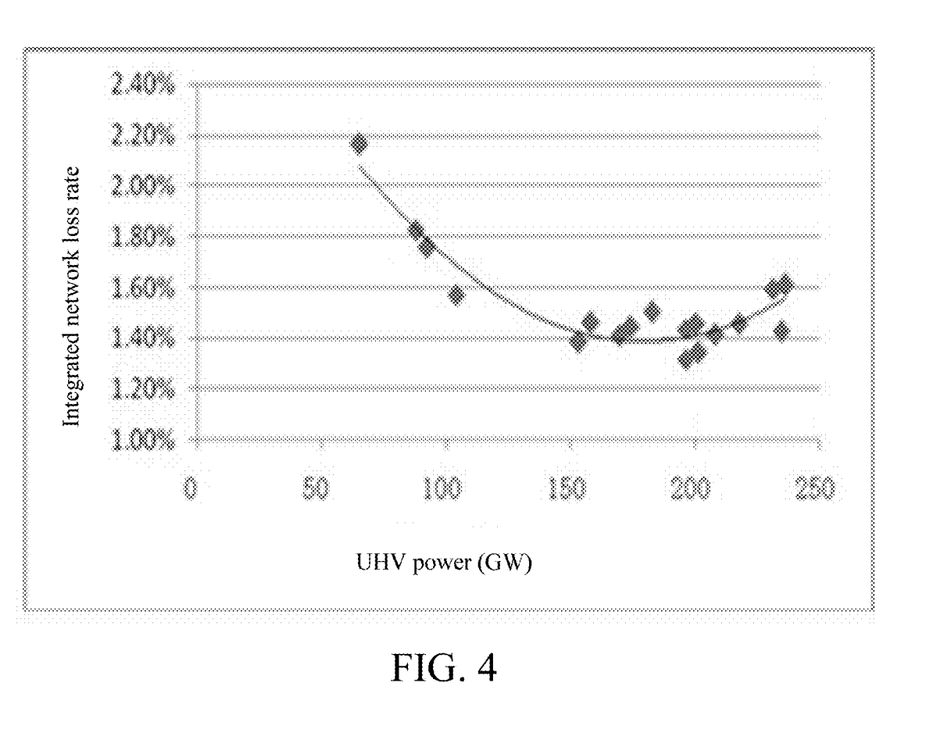
FIG. 4 is a schematic diagram of a relational fitted curve of actual calculation values of integrated network loss rates and transmitting powers of a UHV AC demonstration project according to one embodiment of the invention.

A scatter diagram of actual calculation values of UHV AC integrated network loss rates and transmitting powers drawn according to the data in Table 2 is as shown in FIG. 4 (two groups of obviously abnormal data in May and October 2012 are eliminated), and curve fitting is carried out also by using the least square method, to calculate a function expression of the fitted curve as follows:

$$\eta_2(P)=3.098-0.019P+5.303\times10^{-5}P^2$$

Figure 5:
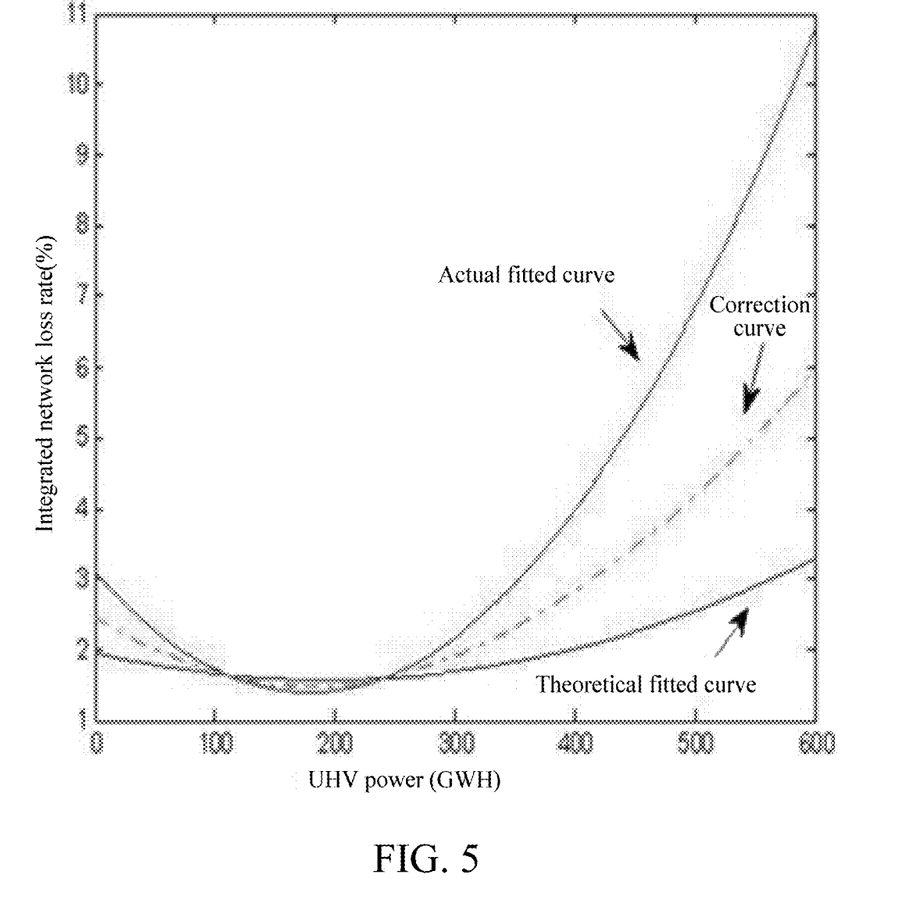
FIG. 5 is a schematic diagram of comparison between a fitted curve of theoretical calculation values, a fitted curve of actual calculation values and a correction fitted curve of integrated network loss rates and transmitting powers of a UHV AC demonstration project according to one embodiment of the invention.

Geometric average correction is performed on the fitted curve of theoretical calculation values by using the fitted curve of the actual calculation values of UHV AC integrated network loss rates and transmitting powers. In consideration of that AC transmitting powers in actual project practice of the UHV AC demonstration project are mostly maintained at 250 GW or below, the fitted curve of the actual calculation values during small-power operation is reltively accurate, while in the case of greater opertion power, the fitted curve of the actual calculation values will genarate a greater error, at this point, the fitted curve of the theoretical calculation values will have a better reference value, and thus the geometric mean of two curves is selected as the value on the correction curve $\eta_{correct}(P)$; a specific operating method is as follows:

selecting n+1 points, $[P_1, \eta_1(P_1)]$, $[P_2,\eta_1(P_2)]$... $[P_i, \eta_1(P_i)]$, ... $[P_{n+1},\eta_1(P_{n+1})]$, from the fitted curve of relations between the theoretical calculation values of UHV AC integrated network loss rates and transmitting powers, wherein $P_1$ is the minimum transmitting power of the UHV AC line, $P_{n+1}$ is the maximum transmitting power of the UHV AC line, $$P_i = P_1 + \frac{(P_{n+1} - P_1)\times(i-1)}{n},$$

i=1, 2, ..., n, n+1; then selecting n+1 points with the same abscissa, $[P_1, \eta_2(P_1)]$, $[P_2, \eta_2(P_2)]$ ... $[P_i, \eta_2(P_i)]$, ... $[P_{n+1}, \eta_2(P_{n+1})]$, from the fitted curve of relations between the actual calculation values of UHV AC integrated network loss rates and transmitting powers, through geometric average correction, obtaining points, $[P_1, \sqrt{\eta_1(P_1)\eta_2(P_1)}]$, $[P_2, \sqrt{\eta_1(P_2)\eta_2(P_2)}]$ ... $[P_i, \sqrt{\eta_1(P_i)\eta_2(P_i)}]$, ... $[P_{n+1}, \sqrt{\eta_1(P_{n+1})\eta_2(P_{n+1})}]$; comparison among the fitted curve of theoretical calculation values, the fitted curve of actual calculation values and the correction fitted curve is as shown in FIG. 5, and the correction curve is fitted to obtain a corresponding function relation:

$$\eta_{correct}(P) = 2.351 - 0.0095P + 2.564 \times 10^{-5}P^2$$

In the monthly planning and trading settlement process of the UHV AC electricity trading, a more accurate UHV AC planned value of integrated network loss rate can be calculated only by substituting the monthly planned average transmitting power (obtained by the UHV AC monthly planned transaction power value divided by 720 hours) into the correction function relation $\eta_{correct}(P)$.

However, in consideration of simple operability, herein, the correction curve is divided into several intervals according to the size of the UHV AC transmitting power: $[P_1, P_2]$, $[P_2, P_3]$ ... $[P_i, P_{i+1}]$, ..., the size of the integrated network loss rate corresponding to the power interval $[P_i, P_{i+1}]$ is calculated through a correction relation, which is set as $$\eta_{correct}\left(\frac{P_i + P_{i+1}}{2}\right),$$

and in this way, a series of power intervals and integrated network loss rates corresponding thereto can be obtained.

The actual transmitting powers of the UHV AC demonstration project at present are basically maintained between 50 to 250 GW, considering that the UHV AC transmitting powers in future may be greater or smaller values, the power range is expanded to 30 GW to 580 GW, and 50 GW is selected as an interval length, to obtain planned values of UHV AC integrated network loss rates shown in Table 3 according to the correction curve function relation.

TABLE 3

Query table of planned values of integrated network loss rates of a UHV AC demonstration project

| Power interval (GW) | Corresponding median | Integrated network loss rate |
|---|---|---|
| [30, 80] | $\eta_{correct}(55)$ | 1.91% |
| [80, 130] | $\eta_{correct}(105)$ | 1.64% |
| [130, 180] | $\eta_{correct}(155)$ | 1.49% |
| [180, 230] | $\eta_{correct}(205)$ | 1.48% |
| [230, 280] | $\eta_{correct}(255)$ | 1.58% |
| [280, 330] | $\eta_{correct}(305)$ | 1.83% |
| [330, 380] | $\eta_{correct}(355)$ | 2.18% |
| [380, 430] | $\eta_{correct}(405)$ | 2.71% |
| [430, 480] | $\eta_{correct}(455)$ | 3.33% |
| [480, 530] | $\eta_{correct}(505)$ | 4.09% |
| [530, 580] | $\eta_{correct}(555)$ | 4.96% |

In the actual monthly planning and trading settlement of UHV AC electricity trading, a more accurate UHV AC monthly integrated network loss rate can be determined by querying Table 3 only by determining the interval according to the size of the monthly planned average transmitting power.

The foregoing description of the exemplary embodiments of the present invention has been presented only for the purposes of illustration and description and is not intended to be exhaustive or to limit the present invention to the precise forms disclosed. Many modifications and variations are possible in light of the above teaching.

The embodiments were chosen and described in order to explain the principles of the present invention and their practical application so as to enable others skilled in the art to utilize the present invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for determining an integrated network loss rate in ultra-high voltage (UHV) AC cross-regional electricity trading, comprising:

(a) obtaining a theoretical calculation value $\eta_{theoretical}$ of an integrated network loss rate corresponding to different transmitting powers of an UHV AC line, according to a formula of:

$$\eta_{theoretical} = \frac{\Delta P_R + \Delta P_C + \Delta P_T}{P}$$

wherein P is an UHV AC transmitting power, $\Delta P_R$ is a resistive loss of the UHV AC line, $\Delta P_T$ is an energy loss for a main transformer of a UHV AC system; $\Delta P_C$ is a corona loss of the UHV AC line;

(b) curve-fitting different transmitting powers of the UHV AC line and the corresponding theoretical calculation values $\eta_{theoretical}$ of integrated network loss rates by using the least square method in a rectangular coordinate system where the abscissa is the UHV AC transmitting power and the ordinate is the integrated network loss rate, to obtain a fitted curve $\eta_1(P) = a_0 + b_0 \times P + c_0 \times P^2$ of relationships between the theoretical calculation values of UHV AC integrated network loss rates and transmitting powers;

(c) according to gateway power statistical data, determining an average transmitting power within respective different-duration time periods of the UHV AC system and calculating an actual calculation value $\eta_{actual}$ of the corresponding integrated network loss rate in each time period, according to a formula of:

$$\eta_{actual} = \frac{\Delta Q}{Q} = \frac{\sum_i SQ_i(+) + \sum_i RQ_i(-)}{\sum_i SQ_i(+)}$$

wherein $\Delta Q$ is the total network loss power of the UHV AC system in each time period, Q is the total power-giving of the UHV AC system in the time period;

$$\sum_i SQ_i$$

is the sum of power-giving of pressure-side gateways in all UHV main transformers in the time period, and $$\sum_i RQ_i$$

is the sum of power-receiving of the pressure-side gateways in all UHV main transformers in the time period;

(d) curve-fitting the UHV AC average transmitting powers and the corresponding actual calculation values actual of $\eta_{actual}$ integrated network loss rates by using the least square method in a rectangular coordinate system where the abscissa is the UHV AC transmitting power and the ordinate is the integrated network loss rate, to obtain a fitted curve $\eta_2(P)=a_1+b_1\times P+c_1\times P^2$ of relations between the actual calculation values of UHV AC integrated network loss rates and transmitting powers;

(e) selecting n+1 points, $[P_1, \eta_1(P_1)]$, $[P_2, \eta_1(P_2)] \ldots [P_i, \eta_1(P_i)], \ldots [P_{n+1}, \eta_1(P_{n+1})]$, from the fitted curve of relations between the theoretical calculation values of UHV AC integrated network loss rates and transmitting powers, wherein $P_1$ is the minimum transmitting power of the UHV AC line, $P_{n+1}$ is the maximum transmitting power of the UHV AC line, $$P_i = P_1 + \frac{(P_{n+1} - P_1) \times (i-1)}{n},$$

i=1, 2, ..., n, n+1; then selecting n+1 points with the same abscissa, $[P_1, \eta_2(P_1)]$, $[P_2, \eta_2(P_2)] \ldots [P_i, \eta_2(P_i)], \ldots [P_{n-1}, \eta_2(P_{n+1})]$, from the fitted curve of relations between the actual calculation values of UHV AC integrated network loss rates and transmitting powers, through geometric average correction, obtaining points,
$[P_1, \sqrt{\eta_1(P_1)\eta_2(P_1)}]$, $[P_2, \sqrt{\eta_1(P_2)\eta_2(P_2)}] \ldots [P_i, \sqrt{\eta_1(P_i)\eta_2(P_i)}], \ldots [P_{n+1}, \sqrt{\eta_1(P_{n+1})\eta_2(P_{n+1})}]$, on a correction curve, and obtaining by fitting a correction relation $\eta_{correct}(P)=a_3+b_3\times P+c_3\times P^2$ between UHV AC integrated network loss rates and transmitting powers by using the least square method in a rectangular coordinate system where the abscissa is the UHV AC transmitting power and the ordinate is the integrated network loss rate;

(f) for UHV AC transmission projects with gateway power historical statistical data, in transaction planning and settlement thereof, substituting UHV AC planned average transmitting powers in a transaction time period into the correction relation $\eta_{correct}(P)=a_3+b_3\times P+c_3\times P^2$, to obtain planned values of UHV AC integrated network loss rates; for UHV AC transmission projects without gateway power historical statistical data, in transaction planning and settlement thereof, substituting a UHV AC planned average transmitting power in a transaction time period into a theoretical calculation value fitted curve function relation $\eta_1(P)=a_0+b_0\times P+c_0\times P^2$, to obtain calculating values of UHV AC integrated network loss rates; and (g) in the UHV AC cross-regional electricity trading, applying the integrated network loss rates to line loss management and trading settlement of electricity trading of UHV AC transmission projects.

2. The method for determining the integrated network loss rate in the UHV AC cross-regional electricity trading according to claim 1, wherein a method for dividing the respective time periods in step (c) comprises: recording changes of the UHV AC transmitting powers with hour data on the hour, the transmitting power of the starting hour on the hour in each time period being an initial power, and when varying amplitude of the transmitting power of the subsequent hour on the hour reaches a % of the initial power, entering into next time period.

3. The method for determining the integrated network loss rate in the UHV AC cross-regional electricity trading according to claim 2, wherein the a % is a value between 5% and 10%.

4. The method for determining the integrated network loss rate in the UHV AC cross-regional electricity trading according to claim 1, the n in step (e) is $\in \{20, 21, 22, \ldots, 200\}$.

* * * * *